United States Patent [19]
Chu

[11] Patent Number: 5,943,716
[45] Date of Patent: Aug. 31, 1999

[54] AIR-CONDITIONED BED HOOD FOR A BABY

[76] Inventor: Yun-Yuan Chu, 5th Fl, No. 208, Hsing An St., Taipei, Taiwan

[21] Appl. No.: 09/124,512

[22] Filed: Jul. 29, 1998

[51] Int. Cl.[6] .......................... A47C 27/00; A47C 31/00; A61G 11/00
[52] U.S. Cl. ..................................... 5/423; 5/658; 600/22
[58] Field of Search ................................ 5/284, 414, 416, 5/658, 423; 600/22; 135/91, 93, 94, 133, 135, 132, 147; 119/312, 314

[56] References Cited

U.S. PATENT DOCUMENTS

| | | | |
|---|---|---|---|
| 2,353,536 | 7/1944 | Abbott et al. ........................... | 5/284 X |
| 3,529,590 | 9/1970 | Grosholz ................................... | 600/22 |
| 3,878,570 | 4/1975 | Donnelly ..................................... | 5/423 |
| 4,936,824 | 6/1990 | Koch et al. ................................. | 600/22 |
| 5,184,865 | 2/1993 | Mohtasham et al. .................... | 135/133 |
| 5,267,941 | 12/1993 | Snyders ..................................... | 600/22 |

Primary Examiner—Brian K. Green
Assistant Examiner—James Hewitt
Attorney, Agent, or Firm—Bacon & Thomas, PLLC

[57] ABSTRACT

An air-conditioned bed hood for a baby, which is connected with an air cleaner having a heater and a humidifier for inputting clean air of constant temperature and moisture, and has the function of air-pressure sealing to provide the lying baby with a comfortable environment and avoid diseases caused by smoke, dust, pollen, etc. Moreover, when the connected power is shut down accidentally, the air-pressure seal of the bed hood will be released automatically so that the lying baby will not be asphyxiated due to lack of fresh air.

11 Claims, 5 Drawing Sheets

AIR-CONDITIONED BED HOOD FOR A BABY

FIELD OF THE INVENTION

The present invention relates to an air-conditioned bed hood for a baby, and more particularly to a bed hood which can provide clean air of constant temperature and moisture when covering a lying baby, and form an air-pressure seal automatically to provide the lying baby with a comfortable environment. When the bed hood is not in use or the connected power is shut down accidentally, the air-pressure seal will be released automatically so that the lying baby will not be asphyxiated due to lack of fresh air.

BACKGROUND OF THE INVENTION

A new-born baby is very difficult to take care of. In winter, it is necessary to keep a warm environment for the baby by air-conditioning or covering the baby with a quilt, but conditioned air is generally too dry for a baby, and a quilt may sometimes cover the nose of the baby and cause breathing problem. In summer, a baby covered with a quilt may generate heat rashes, but a baby without a quilt may catch cold easily. Parents usually put the playpen for a baby in their bedroom, but the low temperature of an air-conditioned environment for parents in summer may not suitable to a baby.

There is no known product in the market which can provide clean air of constant temperature and constant moisture when coverring a lying baby to avoid diseases caused by smoke, dust, pollen, etc.

OBJECTS OF THE INVENTION

It is therefore an object of the present invention to provide an air-conditioned bed hood for a baby, which is connected with an air cleaner having a heater and a humidifier for inputting clean air of constant temperature and moisture, and to forms an air-pressure sealing status automatically to provide the lying baby with a comfort environment.

It is another object of the present invention to provide a bed hood for a baby, which can be opened/closed manually, and without any electronic device on the hood. When the connected power is shut down accidentally, the air-pressure sealing status of the bed hood will be released automatically so that the lying baby will not be asphyxiated due to lack of fresh air.

BRIEF DESCRIPTION OF THE DRAWINGS

The present invention can be better understood by detailed description of the following drawings, in which.

DETAILED DESCRIPTION OF THE INVENTION

Figure 1:
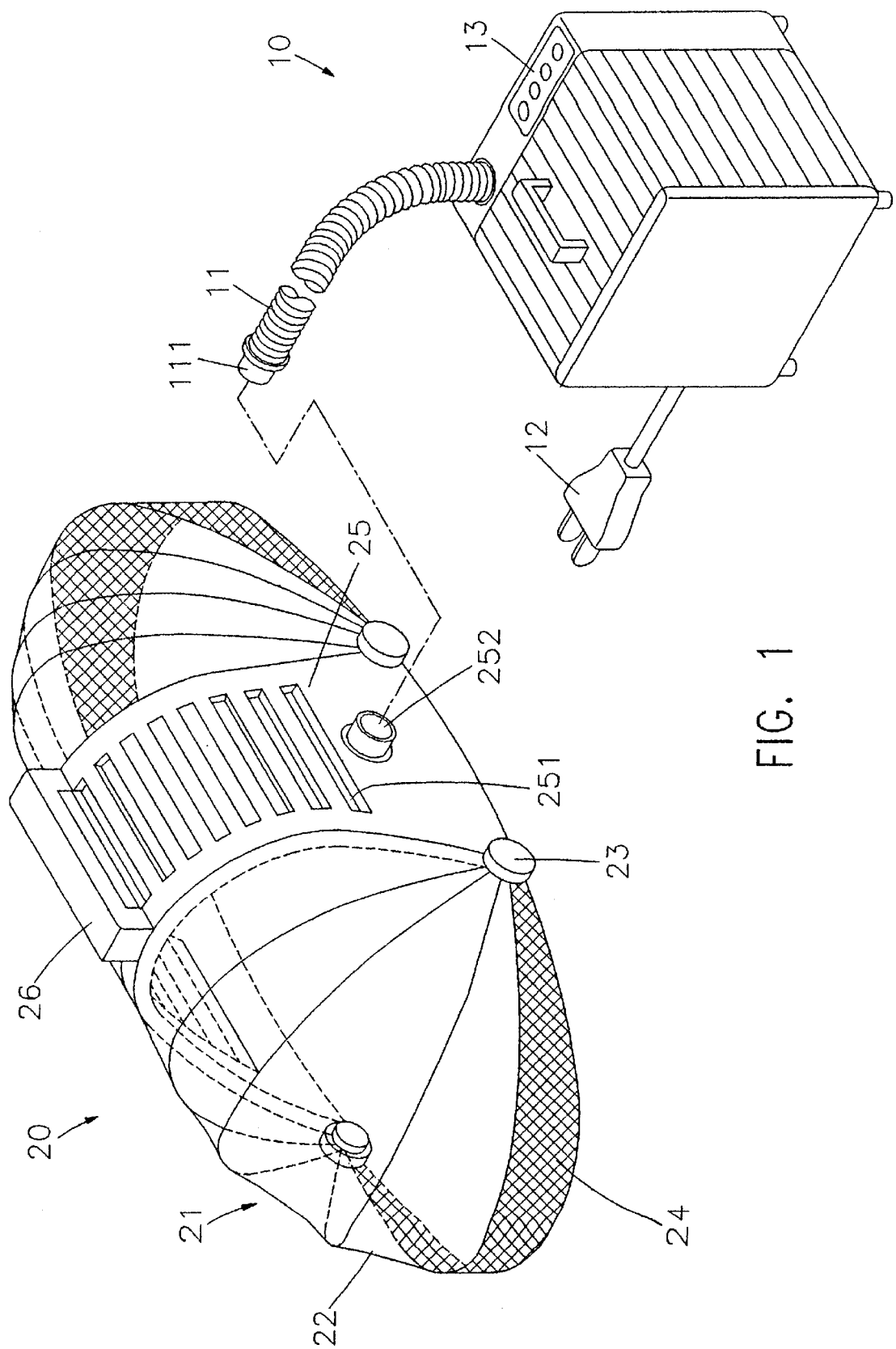
FIG. 1 is a perspective view of a bed hood according to the present invention.

Referring to FIG. 1, which is a perspective view of a bed hood according to the present invention. As shown in the figure, the present invention mainly comprises an air cleaner 10 having a heater and a humidifier for providing clean air of constant temperature and moisture, and a bed hood 20 having a function of air-pressure sealing.

The air cleaner 10 has, for example, a HEPA filter (not shown) with high efficient filtering function to provide clean air of constant temperature and moisture, and which is easily available in the market. An air duct 11 is connected with the air cleaner 10 to output clean air of constant temperature and moisture. The air cleaner 10 has a power line 12 for receiving electric power. A free end of the air duct 11 has an air outlet 111. Moreover, a panel 13 with many push buttons is provided on the air cleaner 10 so that various conditions can be set by those push buttons according to different requirements.

The bed hood 20 is actually semi-ellipsoidal in shape, and has three parts in appearance, i.e. a foldable cover 21, an exhaust member 24 and an arched two-layer covering plate 25. A handle 26 is provided on top of the arched two-layer covering plate 25.

Figure 5:
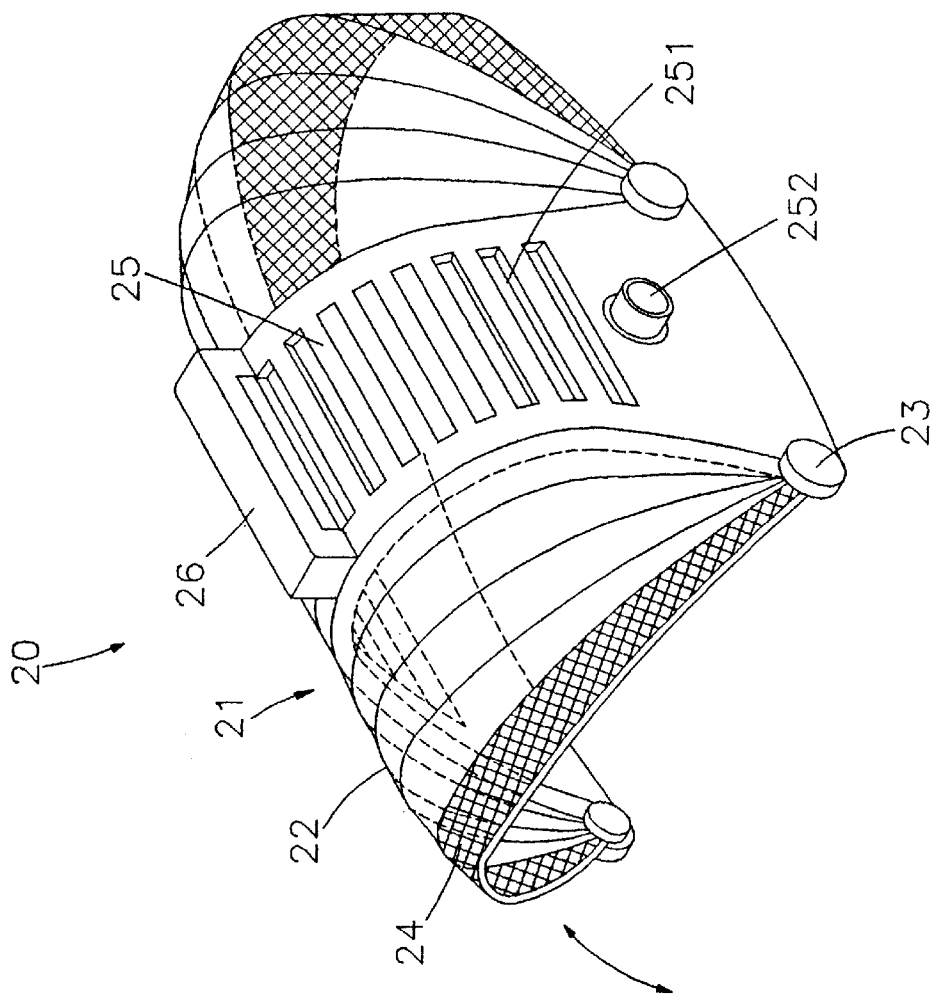
FIG. 5 is a schematic view showing a folding status of a cover of the bed hood according to the present invention.

The foldable cover 21 is placed at two sides of the arched two-layer covering plate 25, and comprises several transparent (or translucent) arched plates 22 laminated together. The transparent arched plates 22 are each narrow at two ends and broad in the middle, and are clamped by a holder 23 at two ends of the arched two-layer covering plate 25. As shown in the figure, there are four holders 23 for clamping the transparent arched plates 22. When pulling/pushing the transparent arched plates 22, the foldable cover 21 can be expanded or folded by the pivotal connections between the transparent arched plates 22 and the holders 23, as shown in FIG. 5.

The exhaust members 24 are at the far right and far left of transparent arched plates 22 when the foldable cover 21 is expanded, and each member 24 has a plurality of air holes for exhausting, and may a screen gauze structure as shown in FIG. 1.

Figure 2:
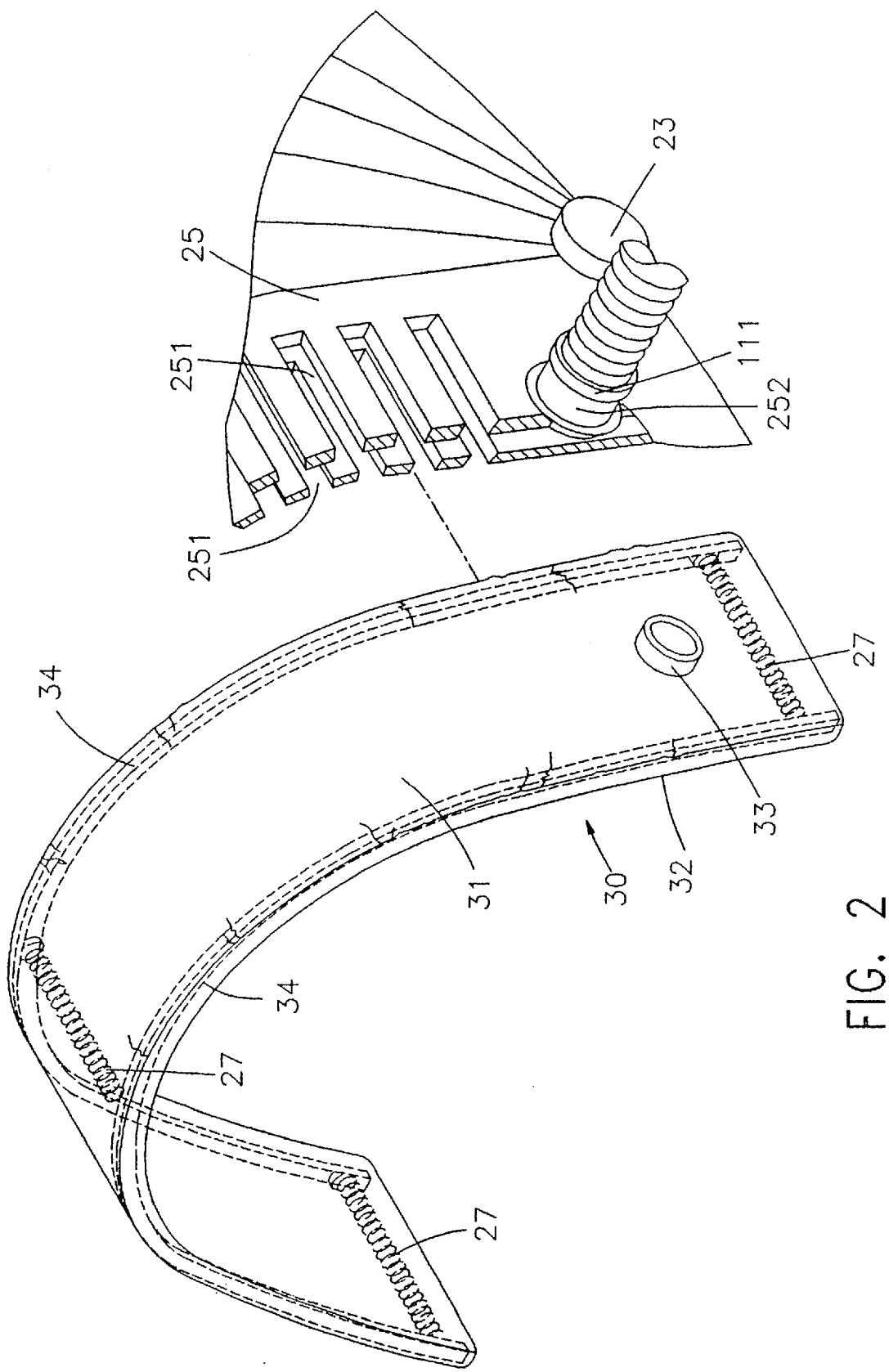
FIG. 2 is a partially exploded perspective view of a two-layer covering plate in the bed hood according to the present invention.
Figure 3:
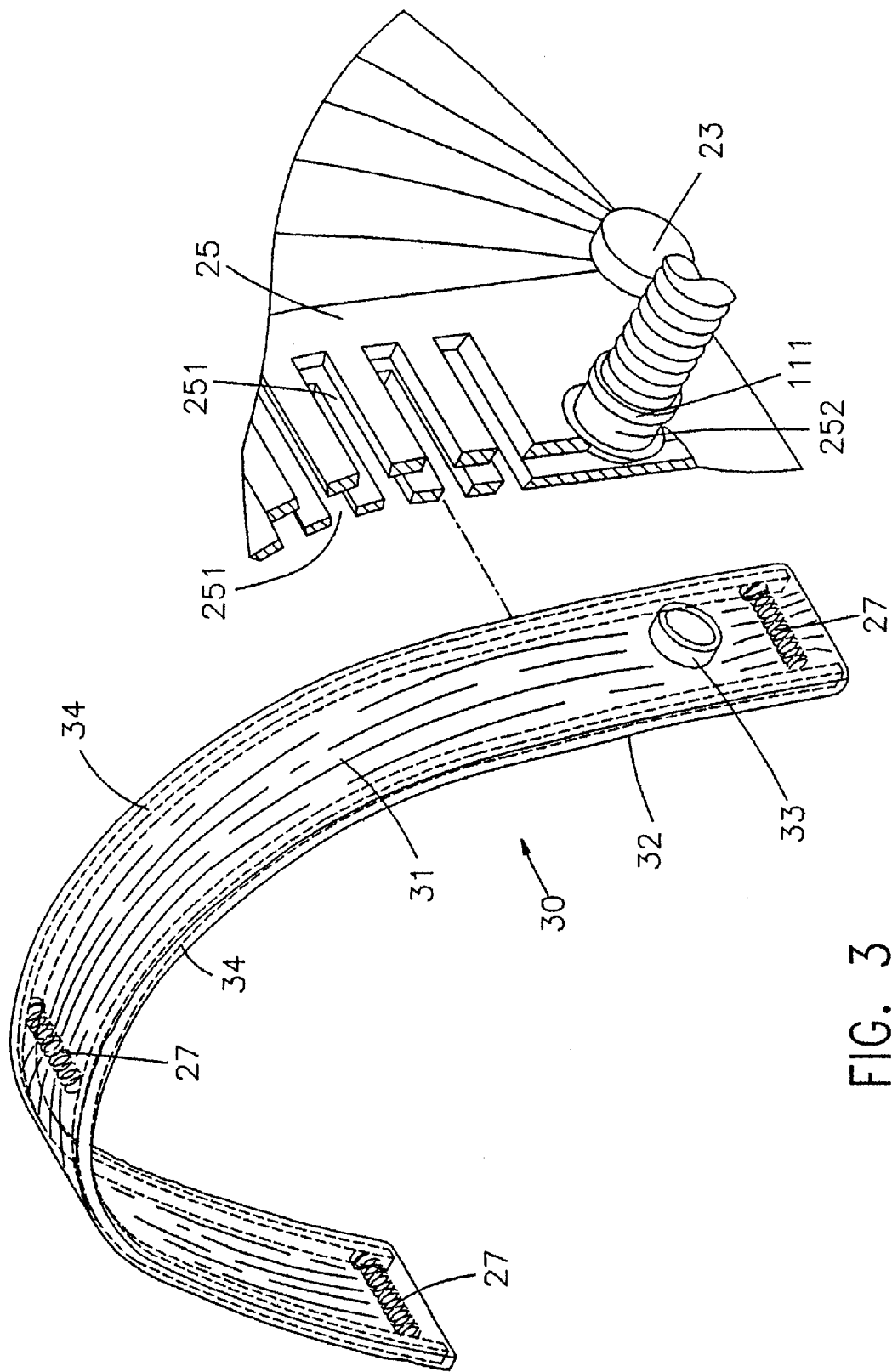
FIG. 3 is a schematic view showing an air bag contracted and wrinkled in a two-layer covering plate according to the present invention.
Figure 4:
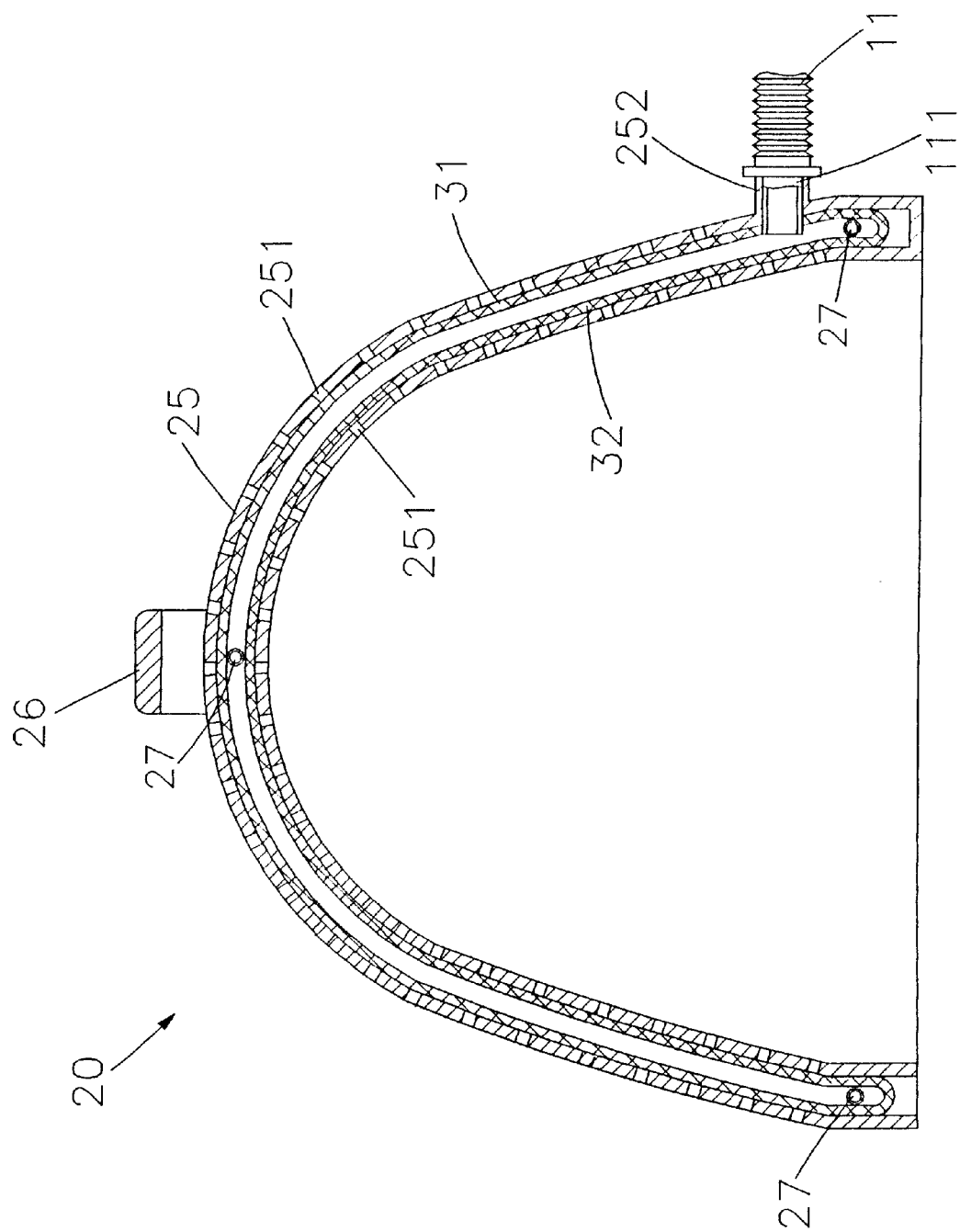
FIG. 4 is a cross sectional view showing the air bag expanded in a two-layer covering plate according to the present invention.

Referring to FIG. 2, a plurality of air apertures 251 are formed in both the two layers of the arched two-layer covering plate 25. A hollow area between the two layers of the arched two-layer covering plate 25 is filled with an air bag 30. The air bag 30 comprises two pieces of cloth, one is an airtight cloth 31 facing the outer layer of the arched two-layer covering plate 25, the other is a semi-permeable cloth 32 facing the inner layer of the arched two-layer covering plate 25. Two flexible bracing rods 34 are provided within the air bag 30 at left and right sides thereof to brace the air bag 30. Several coil springs 27 are connected between the two bracing rods 34. When no air is filled into the air bag 30, the tension of the coil springs 27 will cause the air bag to contract and wrinkle, as shown in FIG. 3, and thus the air bag will not block the air apertures 251 on two layers of the arched twolayer covering plate 25, and air convection can occur through the plurality of air apertures 251 on two layers of the arched two-layer covering plate 25. When air is filled into the air bag 30 to force the coil springs 27 to expand so that the air bag 30 will fill up the hollow area between two layers of the arched two-layer covering plate 25, the airtight cloth 31 will be attached on the outer layer of the arched twolayer covering plate 25, the semi-permeable cloth 32 will be attached on the inner layer of the arched two-layer covering plate 25, as shown in FIG. 4, therefore, air will not flow out but will instead flow into the bed hood 20 gradually.

An air inlet 252 is provided at an appropriate position on the outer layer of the two-layer covering plate 25. A tubular opening 33 provided on airtight cloth 31 of the air bag 30 inside the two-layer covering plate 25 is engaged tightly with the internal end of the air inlet 252, as shown in FIG. 4. The air outlet 111 of the air cleaner 10 is engaged with the outer end of air inlet 252, and the clean air of constant temperature and moisture outputted from the air cleaner 10 will flow into the bed hood 20 continuously. Besides, the air inside the bed hood 20 can flow out gradually through the exhaust members 24.

The bed hood 20 of the present invention has no electronic device at all, so a lying baby inside the bed hood 20 is very safe. When the connected power is shut down accidentally so that air flow is stopped, the tension of the coil springs 27 will cause the air bag 30 to contract and wrinkle, thus the air bag will not block the air aperatures 251 on two layers of the arched two-layer covering plate 25, and air convection can occur through the plurality of air apertures 251 on two layers of the arched two-layer covering plate 25, so that the lying baby will not be asphyxiated due to lack of fresh air. When the bed hood 20 of the present invention is not in use, the cover 21 can be folded up, as shown in FIG. 5.

It is no doubt that after reading the above description any skillful person in the art can create many different variations of the invention without departing from the spirit and scope of the accompanying claims. Therefore, it is intended that the appended claims will cover all those variations.

I claim:

1. An air-conditioned bed hood for a baby, comprising:
   an air cleaner with a heater and a humidifier for providing clean air of constant temperature and moisture, the cleaner having an air duct for outputting clean air of constant temperature and moisture and a power line for receiving electric power;
   a bed hood for covering a bed, the hood having an air inlet for engaging with said air duct of said air cleaner to input air and including an arched two-layer covering plate and a foldable cover, the arched two-layer covering plate including an inner layer and an outer layer;
   a plurality of air apertures are provided on each layer of said arched two-layer covering plate, and an air bag is filled within a hollow area between said inner and outer layers of said arched two-layer covering plate, said air bag comprises two pieces of cloth, one cloth being an airtight cloth facing the outer layer of said arched two-layer covering plate, and the other cloth being a semi-permeable cloth facing the inner layer of said arched two-layer covering plate;
   a tubular opening provided on said airtight cloth of said air bag and engaged tightly with an internal end of said air inlet, and an air outlet of said air duct is engaged with an outer end of said air inlet, so that clean air of constant temperature and moisture outputted from said air cleaner can flow into said air bag continuously and expand said air bag to fill up said hollow area between said inner and outer layers of said arched two-layer covering plate and said airtight cloth will be attached on said outer layer of said arched two-layer covering plate, said semi-permeable cloth will be attached on said inner layer of said arched two-layer covering plate, whereby clean air of constant temperature and moisture will not flow out but instead flow into said bed hood gradually; and
   said foldable cover is provided along a side of said arched two-layer covering plate, the cover comprising a plurality of arched plates laminated together, said arched plates are each narrow at two ends thereof and broad in the middle, and are clamped by a holder at two ends of said arched two-layer covering plate, whereby said foldable cover can be expanded or folded by a pivoting mechanism between said arched plates and said holders.

2. The air-conditioned bed hood for a baby according to claim 1, wherein two flexible bracing rods are provided within said air bag at left and right sides thereof to brace said air bag, a plurality of elastic members are connected between said two bracing rods, when no air is filled into said air bag, a tension of said elastic members will cause said air bag to contract and wrinkle and said air bag will not block said plurality of air apertures on said two layers of arched two-layer covering plate, and air convection can occur through said plurality of air apertures on said inner and outer layers of said arched two-layer covering plate; when air is filled into said air bag to force said elastic members to expand so that said air bag will fill up said hollow area between two layers of said arched two-layer covering plate, said airtight cloth will be attached on said outer layer of said arched two-layer covering plate, said semi-permeable cloth will be attached on said inner layer of said arched two-layer covering plate, and clean air will not flow out but instead flow into said bed hood gradually.

3. The air-conditioned bed hood for a baby according to claim 1, wherein said foldable cover is provided symmetrically at each of two sides of said arched two-layer covering plate.

4. The air-conditioned bed hood for a baby according claim 1, wherein part of said arched plates of said foldable cover are provided with exhaust members.

5. The air-conditioned bed hood for a baby according to claim 4, wherein said exhaust members are air holes provided on part of said arched plates.

6. The air-conditioned bed hood for a baby according to claim 4, wherein part of said arched plates are replaced by a screen gauze structure to form said exhaust members.

7. The air-conditioned bed hood for a baby according to claim 1, wherein said arched plates are transparent or translucent.

8. The air-conditioned bed hood for a baby according to claim 2, wherein said elastic members are coil springs.

9. The air-conditioned bed hood for a baby according to claim 1, wherein a handle is provided on top of said arched two-layer covering plate.

10. The air-conditioned bed hood for a baby according to claim 1, wherein said air cleaner has a panel with a plurality of push buttons thereon for adjusting temperature and moisture of said clean air.

11. The air-conditioned bed hood for a baby according to claim 1, wherein said bed hood is semi-ellipsoidal in shape.

* * * * *